United States Patent
Koch

(10) Patent No.: US 8,671,167 B2
(45) Date of Patent: *Mar. 11, 2014

(54) SYSTEM FOR PROVIDING DEMAND RESPONSE SERVICES

(75) Inventor: Edward Koch, San Rafael, CA (US)

(73) Assignee: Honeywell International Inc., Morristown, NJ (US)

( * ) Notice: Subject to any disclaimer, the term of this patent is extended or adjusted under 35 U.S.C. 154(b) by 364 days.

This patent is subject to a terminal disclaimer.

(21) Appl. No.: 12/834,841

(22) Filed: Jul. 12, 2010

(65) Prior Publication Data

US 2011/0016200 A1    Jan. 20, 2011

Related U.S. Application Data

(60) Provisional application No. 61/271,084, filed on Jul. 17, 2009.

(51) Int. Cl.
G06F 15/16    (2006.01)

(52) U.S. Cl.
USPC ............. 709/220; 709/203; 709/208; 700/90; 700/296

(58) Field of Classification Search
USPC ............ 709/203, 208, 220; 700/90, 296, 206; 20/90, 206
See application file for complete search history.

(56) References Cited

U.S. PATENT DOCUMENTS

| | | | |
|---|---|---|---|
| 4,110,827 A | 8/1978 | Shavit | |
| 4,130,874 A | 12/1978 | Pai | |
| 4,153,936 A | 5/1979 | Scmitz et al. | |
| 4,419,667 A | 12/1983 | Gurr et al. | |
| 4,850,010 A | 7/1989 | Stanbury et al. | |
| 4,937,760 A * | 6/1990 | Beitel et al. | 706/53 |
| 5,341,142 A * | 8/1994 | Reis et al. | 342/64 |
| 5,500,561 A | 3/1996 | Wilhelm | |
| 5,566,084 A | 10/1996 | Cmar | |

(Continued)

FOREIGN PATENT DOCUMENTS

WO    WO 2005033964    4/2005
WO    WO 2008027455    3/2008

(Continued)

OTHER PUBLICATIONS

U.S. App. No. 13/019,943, filed Feb. 2, 2011.

(Continued)

*Primary Examiner* — Tesfay Yohannes
(74) *Attorney, Agent, or Firm* — Seager Tufte & Wickhem LLC.

(57) ABSTRACT

A system for providing demand response services relative to a resource. Demand response information may be conveyed by a provider of the resource to demand-response logic. The logic may translate the demand response information into one of a pre-defined finite amount or number of demand response levels. These levels may be translated to device states, and in turn the device states may be translated to device commands. The translations may be based on rules designed to effect a resource usage scenario. The rules may be easily changed. The commands may be provided to devices at one or more facilities. The devices may control loads, which consume the resource, in accordance with the device commands. The devices may also provide information, such as conditions and resource consumption, relative to the facilities to the provider of the resource. The commands and information may be conveyed via local and wide communication networks.

17 Claims, 6 Drawing Sheets

(56) References Cited

U.S. PATENT DOCUMENTS

| | | |
|---|---|---|
| 5,572,438 A | 11/1996 | Ehlers et al. |
| 5,598,349 A | 1/1997 | Elliason et al. |
| 5,719,854 A | 2/1998 | Choudhury et al. |
| 5,822,553 A | 10/1998 | Gifford et al. |
| 5,892,758 A | 4/1999 | Argyroudis |
| 6,026,375 A | 2/2000 | Hall et al. |
| 6,195,367 B1 | 2/2001 | Jakobik et al. |
| 6,209,018 B1 | 3/2001 | Ben-shachar et al. |
| 6,252,950 B1 | 6/2001 | Duty et al. |
| 6,259,723 B1 | 7/2001 | Miyashita |
| 6,278,717 B1 | 8/2001 | Arsenault et al. |
| 6,289,384 B1 | 9/2001 | Whipple et al. |
| 6,366,926 B1 | 4/2002 | Pohlmann et al. |
| 6,446,136 B1 | 9/2002 | Pohlmann et al. |
| 6,519,509 B1 | 2/2003 | Nierlich et al. |
| 6,529,723 B1 | 3/2003 | Bentley |
| 6,566,926 B1 | 5/2003 | Patterson |
| 6,574,581 B1 | 6/2003 | Bohrer et al. |
| 6,832,249 B2 | 12/2004 | Ciscon et al. |
| 6,857,022 B1 * | 2/2005 | Scanlan .................. 709/229 |
| 6,865,685 B2 | 3/2005 | Hammond et al. |
| 6,985,087 B2 | 1/2006 | Soliman |
| 7,010,700 B1 * | 3/2006 | Foss et al. .................. 726/22 |
| 7,069,309 B1 | 6/2006 | Dodrill et al. |
| 7,260,616 B1 | 8/2007 | Cook |
| 7,337,237 B2 | 2/2008 | Salahshoor et al. |
| 7,346,467 B2 | 3/2008 | Bohrer et al. |
| 7,392,115 B2 | 6/2008 | Schindler |
| 7,528,503 B2 | 5/2009 | Rognli et al. |
| 7,565,227 B2 | 7/2009 | Richard et al. |
| 7,650,289 B2 | 1/2010 | Cooper et al. |
| 7,676,657 B2 | 3/2010 | Lindholm et al. |
| 7,702,424 B2 | 4/2010 | Cannon et al. |
| 7,742,953 B2 | 6/2010 | King et al. |
| 7,775,191 B2 | 8/2010 | Hou |
| 7,797,009 B2 | 9/2010 | Kiiskila et al. |
| 7,806,845 B2 | 10/2010 | Arm et al. |
| 7,845,576 B2 | 12/2010 | Siddaramanna et al. |
| 7,885,718 B2 | 2/2011 | Yano et al. |
| 7,886,166 B2 * | 2/2011 | Shnekendorf et al. ........ 713/310 |
| 7,925,384 B2 | 4/2011 | Huizenga |
| 7,941,528 B2 | 5/2011 | Hicks, III et al. |
| 7,958,229 B2 | 6/2011 | Conway |
| 8,023,410 B2 | 9/2011 | O'Neill |
| 8,073,558 B2 | 12/2011 | Koch et al. |
| 8,140,658 B1 | 3/2012 | Gelvin et al. |
| 8,163,276 B2 | 4/2012 | Hedrick et al. |
| 8,170,774 B2 | 5/2012 | Forte et al. |
| 8,183,995 B2 | 5/2012 | Wang et al. |
| 8,199,773 B2 | 6/2012 | Aubin et al. |
| 8,232,745 B2 | 7/2012 | Chemel et al. |
| 8,234,876 B2 | 8/2012 | Parsonnet et al. |
| 8,260,468 B2 | 9/2012 | Ippolito et al. |
| 8,260,650 B2 | 9/2012 | Miller |
| 8,291,243 B2 | 10/2012 | Castelli et al. |
| 8,327,024 B2 | 12/2012 | Pattison et al. |
| 8,373,547 B2 | 2/2013 | Benya et al. |
| 8,406,937 B2 | 3/2013 | Verfuerth et al. |
| 8,417,391 B1 | 4/2013 | Rombouts et al. |
| 2003/0016237 A1 * | 1/2003 | Hickey .................. 345/700 |
| 2003/0033230 A1 | 2/2003 | Mccall |
| 2003/0135508 A1 * | 7/2003 | Chorafakis et al. .......... 707/100 |
| 2003/0233064 A1 | 12/2003 | Arm et al. |
| 2004/0034484 A1 | 2/2004 | Solomita, Jr. et al. |
| 2004/0078154 A1 | 4/2004 | Hunter |
| 2004/0137897 A1 | 7/2004 | Teixeira |
| 2004/0203649 A1 | 10/2004 | Cashiola |
| 2005/0027636 A1 | 2/2005 | Gilbert et al. |
| 2005/0152694 A1 | 7/2005 | Chown |
| 2005/0172304 A1 | 8/2005 | Tavares et al. |
| 2005/0194456 A1 | 9/2005 | Tessier et al. |
| 2005/0229220 A1 | 10/2005 | Fisher et al. |
| 2005/0262026 A1 | 11/2005 | Watkins |
| 2006/0047369 A1 | 3/2006 | Brewster et al. |
| 2007/0005195 A1 | 1/2007 | Pasquale et al. |
| 2007/0222295 A1 | 9/2007 | Wareham et al. |
| 2008/0011864 A1 | 1/2008 | Tessier et al. |
| 2008/0046715 A1 * | 2/2008 | Balazs et al. .................. 713/152 |
| 2008/0167931 A1 | 7/2008 | Gerstemeier et al. |
| 2008/0172312 A1 | 7/2008 | Synesiou et al. |
| 2008/0177678 A1 | 7/2008 | Di Martini et al. |
| 2008/0183316 A1 * | 7/2008 | Clayton .................. 700/90 |
| 2008/0262848 A1 * | 10/2008 | Shienbrood et al. .......... 704/275 |
| 2009/0001180 A1 | 1/2009 | Siddaramanna et al. |
| 2009/0001181 A1 | 1/2009 | Siddaramanna et al. |
| 2009/0046625 A1 | 2/2009 | Diener et al. |
| 2009/0077397 A1 * | 3/2009 | Shnekendorf et al. ........ 713/310 |
| 2009/0092062 A1 | 4/2009 | Koch et al. |
| 2009/0187499 A1 | 7/2009 | Mulder et al. |
| 2009/0198384 A1 | 8/2009 | Ahn |
| 2009/0204977 A1 | 8/2009 | Tavares et al. |
| 2009/0271255 A1 | 10/2009 | Utter et al. |
| 2009/0281674 A1 | 11/2009 | Taft |
| 2009/0295594 A1 | 12/2009 | Yoon |
| 2009/0297488 A1 | 12/2009 | Fraser et al. |
| 2009/0313083 A1 | 12/2009 | Dillon et al. |
| 2009/0319090 A1 | 12/2009 | Dillon et al. |
| 2009/0326726 A1 | 12/2009 | Ippolito et al. |
| 2010/0057480 A1 | 3/2010 | Arfin et al. |
| 2010/0076615 A1 | 3/2010 | Daniel et al. |
| 2010/0076835 A1 | 3/2010 | Silverman |
| 2010/0088261 A1 | 4/2010 | Montalvo |
| 2010/0106342 A1 | 4/2010 | Ko et al. |
| 2010/0106543 A1 | 4/2010 | Marti |
| 2010/0114340 A1 | 5/2010 | Huizenga et al. |
| 2010/0138363 A1 | 6/2010 | Batterberry et al. |
| 2010/0168924 A1 | 7/2010 | Tessier et al. |
| 2010/0241285 A1 * | 9/2010 | Johnson et al. ................ 700/296 |
| 2010/0274377 A1 | 10/2010 | Kaufman et al. |
| 2010/0283606 A1 | 11/2010 | Tsypin et al. |
| 2010/0324962 A1 | 12/2010 | Nesler et al. |
| 2011/0040550 A1 | 2/2011 | Graber et al. |
| 2011/0040666 A1 | 2/2011 | Crabtree et al. |
| 2011/0046805 A1 | 2/2011 | Bedros et al. |
| 2011/0093493 A1 | 4/2011 | Nair et al. |
| 2011/0113068 A1 | 5/2011 | Ouyang |
| 2011/0172836 A1 | 7/2011 | Boss et al. |
| 2011/0172838 A1 | 7/2011 | Pai et al. |
| 2011/0196539 A1 | 8/2011 | Nair et al. |
| 2011/0196546 A1 | 8/2011 | Muller et al. |
| 2011/0199209 A1 | 8/2011 | Siddaramanna et al. |
| 2011/0212700 A1 | 9/2011 | Petite |
| 2011/0231320 A1 | 9/2011 | Irving |
| 2011/0258049 A1 | 10/2011 | Ramer et al. |
| 2011/0301774 A1 | 12/2011 | Koch |
| 2012/0066397 A1 | 3/2012 | Koch et al. |
| 2012/0066686 A1 | 3/2012 | Koch |
| 2012/0093141 A1 | 4/2012 | Imes et al. |
| 2012/0109399 A1 | 5/2012 | Tran |
| 2012/0136915 A1 | 5/2012 | Koch et al. |
| 2012/0173030 A1 | 7/2012 | Taft |
| 2012/0197456 A1 | 8/2012 | Walter et al. |
| 2012/0197457 A1 | 8/2012 | Walter et al. |
| 2012/0197458 A1 | 8/2012 | Walter et al. |
| 2012/0245968 A1 | 9/2012 | Beaulieu et al. |
| 2012/0271473 A1 | 10/2012 | Koch |
| 2012/0277920 A1 | 11/2012 | Koch |
| 2013/0035992 A1 | 2/2013 | Silverman |
| 2013/0079931 A1 | 3/2013 | Wanchoo et al. |

FOREIGN PATENT DOCUMENTS

| | | |
|---|---|---|
| WO | WO 2008027457 | 3/2008 |
| WO | WO 2009/006133 | 1/2009 |
| WO | WO 2009/020606 | 2/2009 |
| WO | WO 2009/023230 | 2/2009 |
| WO | WO 2009/027617 | 3/2009 |
| WO | WO 2009/085610 | 7/2009 |
| WO | WO 2011/065007 | 6/2011 |

(56) References Cited

FOREIGN PATENT DOCUMENTS

| WO | WO 2013/025565 | 2/2013 |
| WO | WO 2013/055551 | 4/2013 |

OTHER PUBLICATIONS

Coughlin et al., "Estimating Demand Response Load Impacts: Evaluation of Baseline Load Models for Non-Residential Buildings in California," Lawrence Berkeley National Laboratory, Report No. LBNL-63728, 33 pages, Jan. 2008.
Kiliccote et al., "Open Automated Demand Response Communications in Demand Response for Wholesale Ancillary Services," Lawrence Berkeley National Laboratory, Report No. LBNL-2945E, 13 pages, Nov. 2009.
Koch et al., "Architecture Concepts and Technical Issues for an Open, Interoperable Automated Demand Response Infrastructure," Berkeley National Laboratory, Report No. LBNL-63664, 7 pages, Oct. 2007.
Koch et al., "Direct Versus Facility Centric Load Control for Automated Demand Response," Lawrence Berkeley National Laboratory, Report No. LBNL-2905E, 11 pages, Nov. 2009.
Koch et al., "Open Automated Demand Response for Small Commercial Buildings," Lawrence Berkeley National Laboratory, Report No. LBNL-2195E, 104 pages, Jul. 2009.
Koch et al., "Scenarios for Consuming Standardized Automated Demand Response Signals," Lawrence Berkeley National Laboratory, Report No. LBNL-1362E, 10 pages, Nov. 2008.
Piette et al., "Automated Critical Peak Pricing Field Tests: Program Description and Results," Berkeley National Laboratory, Report No. LBNL-59351, 67 pages, Apr. 2006.
Piette et al., "Automated Critical Peak Pricing Field Tests: 2006 Pilot Program Description and Results," Berkeley National Laboratory, Report No. LBNL-62218, 67 pages, Aug. 2007.
Piette et al., "Design and Implementation of an Open, Interoperable Automated Demand Response Infrastructure," Berkeley National Laboratory, Report No. LBNL-63665, 6 pages, Oct. 2007.
Piette et al., "Findings From Seven Years of Field Performance Data for Automated Demand Response in Commercial Buildings," Berkeley National Laboratory, Report No. LBNL-3643E, 15 pages, May 2010.
Piette et al., "Findings From the 2004 Fully Automated Demand Response Tests in Large Facilities," Lawrence Berkeley National Laboratory, Report No. LBNL-58178, 197 pages, Sep. 2005.
Piette et al., "Linking Continuous Energy Management and Open Automated Demand Response," Lawrence Berkeley National Laboratory, Report No. LBNL-1361E, 9 pages, Nov. 2008.
Piette et al., "Open Automated Demand Response Communications Specification," Version 1.0, CEC-500-2009-063, 214 pages, Apr. 2009.
Piette et al., "Participation through Automation: Fully Automated Critical Peak Pricing in Commercial Buildings," Berkeley National Laboratory, Report No. LBNL-60614, 14 pages, Aug. 13-18, 2006.
Watson et al., "Machine to Machine (M2M) Technology in Demand Responsive Commercial Buildings," Berkeley National Laboratory, Report No. LBNL-55087, 18 pages, Aug. 2004.
Yin et al., "Auto-DR and Pre-Cooling of Buildings at Tri-City Corporate Center," Lawrence Berkeley National Laboratory, Report No. LBNL-3348, 140 pages, Nov. 2008.
U.S. Appl. No. 12/895,640, filed Sep. 30, 2010.
U.S. Appl. No. 13/016,181, filed Jan. 28, 2011.
U.S. Appl. No. 13/016,265, filed Jan. 28, 2011.
U.S. Appl. No. 13/016,306, filed Jan. 28, 2011.
U.S. Appl. No. 13/272,086, filed Oct. 12, 2011.
U.S. Appl. No. 13/298,706, filed Nov. 17, 2011.
U.S. Appl. No. 13/299,716, filed Nov. 18, 2011.
Cruz, "Tutorial on GPU Computing with an Introduction to CUDA," 37 pages, prior to Nov. 17, 2011.
Honeywell, "Automated Demand Response—Southern California Program," 2 pages, printed Aug. 1, 2011.
Honeywell, "The Perfect Response to Peak Events," 4 pages, Nov. 2010.
http://en.wikipedia.org/wiki/Demand_response, "Demand Response," 10 pages, printed Feb. 3, 2012.
https://buildingsolutions.honeywell.com/Cultures/en-US/Markets/Utilities/DemandResponse/, 1page, printed Feb. 3, 2012.
Kiliccote et al., "Findings from Seven Years of Field Performance Data for Automated Demand Response in Commercial Buildings," Lawrence Berkeley National Laboratory, Report No. LBNL-3643E, May 2010.
Koch, "The Demand Response Automation Server (DRAS)," Building Performance, http://www.akuacom.com/assets/pdf/ASHRAE_2008_Ed_Koch.pdf, 18 pages, prior to Nov. 17, 2011.
Abdullah et al., "Demand-Side Energy Management Performed Using Direct Feedback via Mobile Systems: Enables Utilities to Deploy Consumer Based Demand Response Programs," 2010 IEEE International Energy Conference and Exhibition, pp. 172-177, 2010.
European Search Report for Related Application No. EP 12169650.4, Dated Nov. 22, 2012.
U.S. Appl. No. 13/621,195, filed Sep. 15, 2012.
"Smart Demand Response: A Discussion Paper," Energy Networks Association, energyuk, 44 pages, prior to Nov. 29, 2012.
International Search Report for PCT ApplicationSerial No. pct/us2012/058537, International Filing Date Oct. 3, 2012.
U.S. Appl. No. 13/689,551, filed Nov. 29, 2012.
http://www.naesb.org/pdf3/dsmee012308213.doc, "Demand Response Measurement and Verification Literature Review," 29 pages, created Jan. 14, 2008, modified Dec. 18, 2012.
Hunt, "Automated Demand Response System and Advanced End-Use Services Platform," Optimal Technologies, 31, pages, Sep. 24, 2004.
Olson, "New Approaches in Automating and Optimizing Demand Response to Solve Peak Load Management Problems," Building IQ brochure, 8 pages, 2011.
Schisler et al., "The Role of Demand Response in Ancillary Services Markets," IEEE, 3 pages, 2008.
Violette et al., "DRR Valuation and Market Analysis vol. II: Assessing the DRR Benefits and Costs," Summit Blue Consulting, 112 pages, Jan. 6, 2006.
Zaidi et al., "Load Recognition for Automated Demand Response in Microgrids," IEEE, pp. 2436-2439, 2010.
Holmberg, "Facility Interface to the Smart Grid," National Institute of Standards and Technology, 7 pages, printed 2012.

* cited by examiner

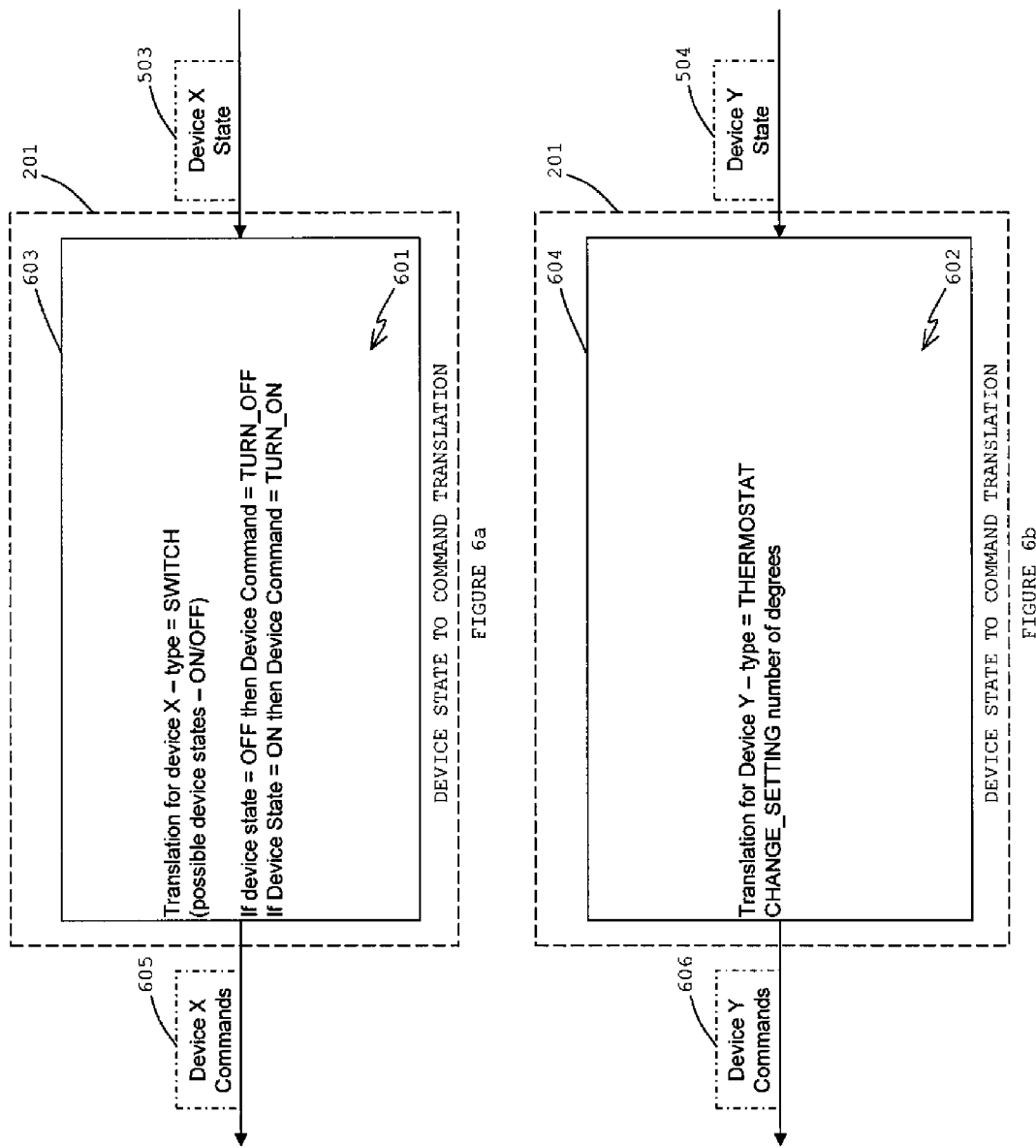

SYSTEM FOR PROVIDING DEMAND RESPONSE SERVICES

This application claims the benefit of U.S. Provisional Patent Application No. 61/271,084, filed Jul. 17, 2009, and entitled "System and method for providing demand response services". U.S. Provisional Patent Application No. 61/271,084, filed Jul. 17, 2009, is hereby incorporated by reference.

BACKGROUND

The invention pertains to utility resources and particularly to assessment and distribution of the resources. More particularly, the invention pertains to beneficial management of resources and their loads.

SUMMARY

The invention is a system for providing demand response services relative to a resource. Demand response information may be conveyed by a provider of the resource to a demand response logic. The logic may translate the demand response information to one of a pre-defined finite amount or number of demand response levels. These levels may be translated to device states, and in turn the device states may be translated to device commands. The translations may be based on rules which can be easily changed. The commands may be provided to devices at one or more facilities. The devices may control loads, which consume the resource, in accordance with the device commands. The devices may also provide information, such as conditions and resource consumption, relative to the facilities to the provider of the resource. The commands and information may be communicated via local and wide networks.

BRIEF DESCRIPTION OF THE DRAWING

FIGS. 6a and 6b are diagrams depicting device state-to-command translation.

DESCRIPTION

Figure 1:
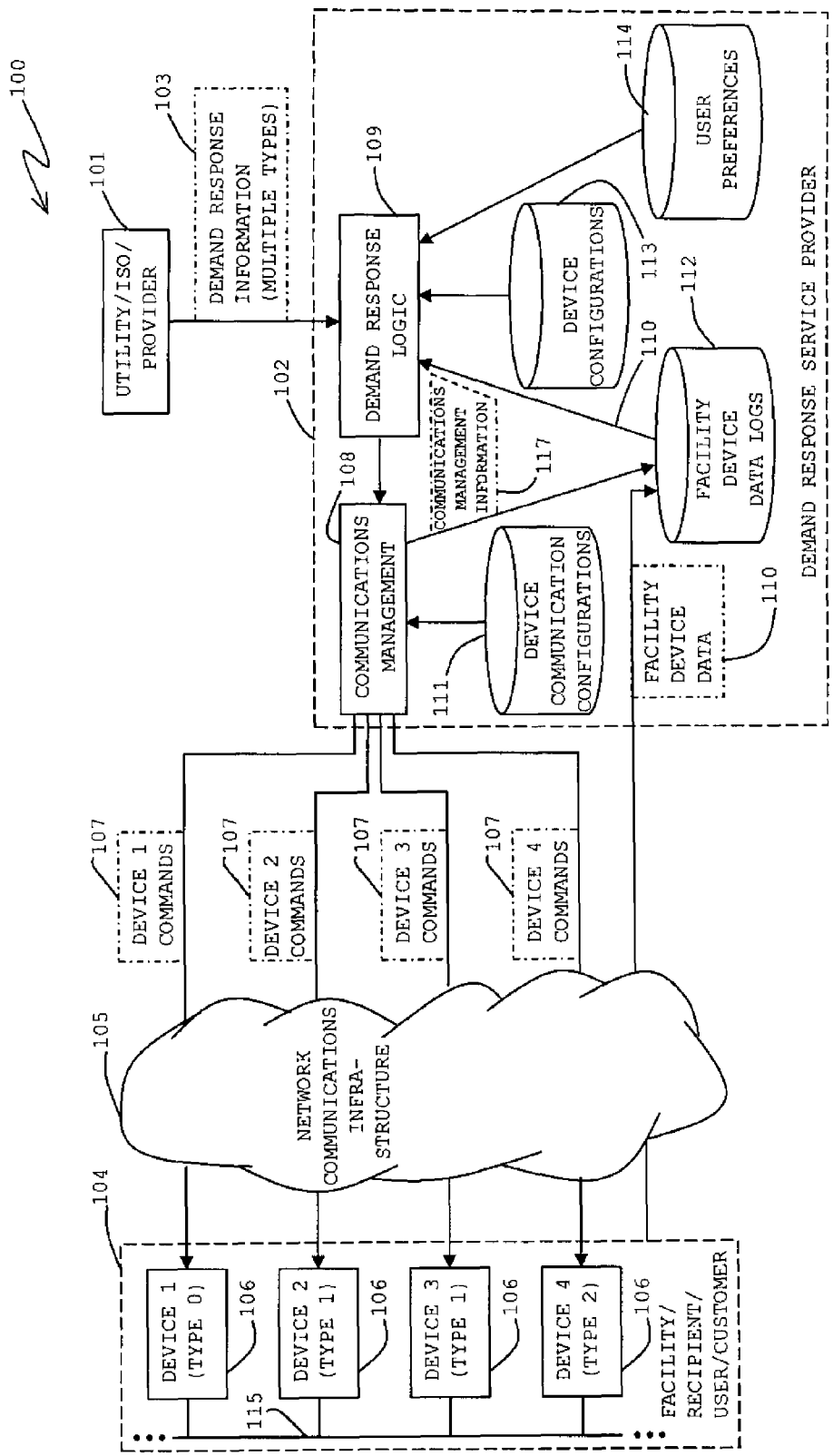
FIG. 1 is a diagram showing an overall architecture of the present system.

The present system may be used to provide demand response services. The term "demand response" may also be referred to as "DR", "demand-response", or other term that reasonably indicates "demand response". In general, a demand response may be defined as a process wherein a utility, provider or independent system operator (utility/ISO) that is responsible for providing a resource (such as electricity) issues some sort of information to a customer/recipient/facility/user (customer or customers) with an intention of affecting the customers' consumption of that resource during some critical period of time. Henceforth, a focus may be on electricity as an example of the resource in question. However, the present system may focus on other resources such as water. Customers which consume the resource in question could typically be facilities that may be managed by so-called facility owners. Facilities may include residences, commercial buildings, industrial facilities, and the like.

There may be numerous reasons why a utility/ISO may need to affect its customer's use of a resource. Reasons may include: 1) A shortage of the resource resulting in potential disruption of service; 2) Price fluctuations of the resource in the marketplace; 3) A need to modulate usage to manage a resource distribution network; and 4) a need to shift usage to different time periods with the goal of more efficiently utilizing both the generation and distribution of the resource.

The present system may support virtually all of the scenarios described herein including other scenarios since the system includes a generalized approach which is not dependent upon a specific reason for initiating a demand-response action.

Based upon a reason for initiating a demand-response related action, information provided by a utility/ISO may include: 1) Resource prices; 2) Specific instructions for shedding a certain amount of the resource; 3) Supply and distribution reliability; and 4) Resource generation attributes.

The present system, useable by customers for responding to demand-response related information provided by the utility/ISO, may utilize the following items: 1) Communicating devices within facilities that may receive instructions and based upon those instructions could change the way in which equipment in the facility consumes the resource; henceforth, the equipment and entities that consume the resource may be referred to as "loads", and examples of such devices that control loads might be intelligent thermostats, lighting controls and appliances; also, the states of these devices and the loads that they control may be affected in some automated fashion by sending commands to the devices which control the loads; and these commands may come from entities outside the facility or come from some sort of control system within the facility itself; 2) Communicating devices within facilities that may measure and report a variety of information concerning the operation of the facility, of which examples can include meters that measure electricity consumption and devices that can report the state of various loads; and 3) Intermediaries that may be referred to as demand-response service providers which are responsible for managing the operation of the loads in a facility in response to demand-response actions that are initiated by the utility/ISO, in which an intermediary may be separate from the facility and provide a service to take demand-response information provided by the utility/ISO and translate the information into appropriate messages and commands which may be sent to communicating devices within the facility; and in some cases the intermediary may be the utility/ISO itself.

The present system may focus on a process utilized by a demand-response service provider to translate the demand-response related information provided by the utility/ISO into appropriate commands and messages for specific devices within the facility.

Items noted in the diagrams may be directly or indirectly regarded as modules and/or sub-modules in the description and/or the claims. These items may be composed of hardware and/or software.

Demand-response services architecture may be noted. An overall architecture 100 is shown in the diagram of FIG. 1. Architecture 100 may include a utility/ISO/provider 101 that provides the resource and is responsible for initiating a demand-response action by providing or publishing multiple types of demand-response related information 103 of multiple types. Architecture 100 may also include a facility/recipient/user/customer (facility) 104 that contains loads which consume the resource provided by the utility/ISO 101. There may be one or more facilities. The loads in facility 104 may be both measured and controlled by a variety of devices 106 within the facility. Each of these devices 106 may be capable of communicating with other devices 106, either amongst themselves or as part of some local area communications network 115 within the facility or via some wider or wide area network 105 outside the facility 104. Examples of local area communications 115 may include wireless networks such as ZigBee™, power line communications, and others. The wide area communications 105 may include examples such as the internet and broadband communications, and also advanced metering infrastructures (AMI). Wide area network 105 may be an approach by which entities outside a facility 104 can communicate with devices 106 within the facilities 104.

AMI may be regarded as a smart meter that can identify resource consumption in more detail than a conventional meter. It may communicate information via a network back to a local utility for monitoring and/or billing. The meter may also receive information from a utility to issue shed strategies within a consumer's facility, such as a home.

The diagram of FIG. 1 depicts each of the devices 106 communicating over the wide area network 105. The diagram may depict a logical information flow and not necessarily imply that each device is physically capable of communication over the wide area network. It is anticipated that each of the devices 106 may communicate via the local area network 115 with some other entity that will proxy communications between the devices and other entities outside the facility 104 over the wide area network 105. Examples of such proxies may be intelligent meters that are part of AMI deployments or other gateways/routers and controllers within the facility.

Between the utility/ISO 101 and the facility 104 may be an entity referred to as a demand-response service provider 102. The demand-response service provider 102 may take information 103 provided or published by the utility/ISO 101 concerning demand-response actions and facility device data 110, and translate that information and data into appropriate device commands 107 which are sent to the facility 104. A purpose of this translation may be for assuring that the facility 104 responds in the most appropriate manner to the demand-response information 103 provided by the utility/ISO 101.

A translation process may be provided by the demand-response logic 109. Demand-response logic 109 may depend upon a variety of information, including: 1) User preferences 114 that specify the facility-wide requirements for how to respond to demand-response actions; 2) Device configurations 113 that provide requirements for how individual devices 106 should respond to demand-response actions; and 3) Facility device data logs 112 that provide information about the state of a facility 104 including things like meter data and device states. Facility device data 110 may be provided by facility 104 to the facility device data logs 112. Device data 110, as might be conditioned or controlled by communications management information 117 from communications management 108, may be forwarded on from device data logs 112 to logic 109.

An output of the demand-response logic 109 may be a set of device specific commands and messages that are communicated to a facility 104 via a communications management approach or module 108 and the network communications infrastructure 105. The communications management module 108 may know how to send a message to the devices 106 and rely on device communication configurations 111 which provide information that specifies how the demand-response service provider 102 should communicate with specific devices 106 within the facility 104.

Figure 2:
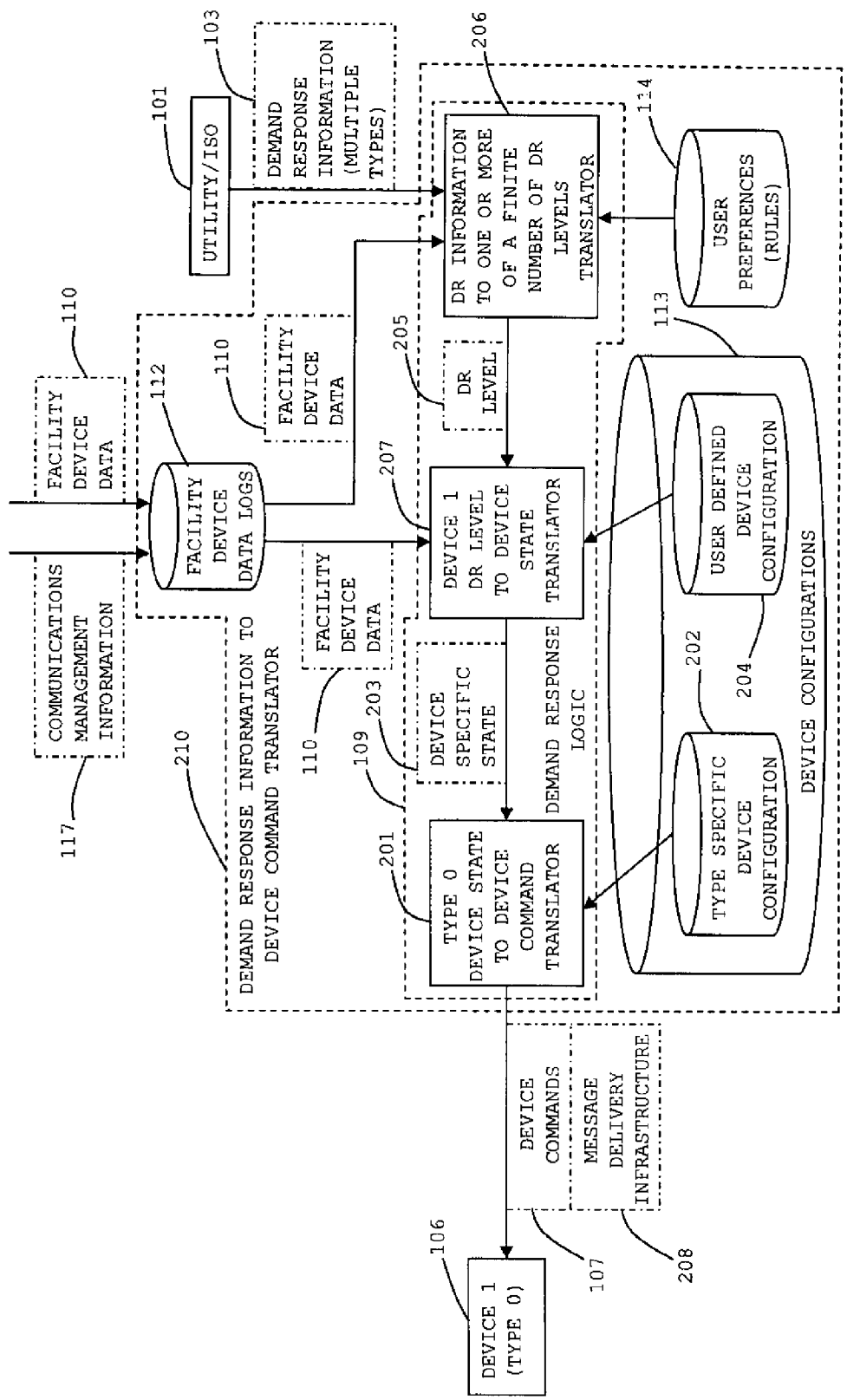
FIG. 2 is a diagram of steps or stages involved in the translation of demand-response related information into device specific commands and messages.

A demand-response information to a device command translator 210 approach or module is shown in a diagram of FIG. 2. The diagram shows a breakdown of the translation process for turning demand-response information 103 provided by or published from utility/ISO 101 into a set of specific device commands 107 targeted for a specific device 106. A wide range of different types of information may be provided or published by the utility/ISO 101 in the form of demand-response information and likewise there may be a wide range of different devices 106 that can exist in the facility 104, each of which may support a wide range of functionalities and commands. The translation process may be broken down into a number of steps or stages, each of which can be performed by applying a set of specified rules. By this break-down, virtually the entire process may be customized for specific scenarios of resource usage.

The translation process may begin with a step or stage 206 which takes the demand-response information 103, the facility device data 110 (as might be conditioned or controlled by communications management information 117 from communications management 108 at data logs 112) from facility device data logs 112, and user preferences 114, and applies a set of rules to produce a demand-response level 205. A step or stage of the translation process may be regarded as a translator. The set of rules may be designed to effect a desired output, such as a level 205, from stage 206.

The demand-response level 205 may be one of a pre-defined finite set or number of enumerated values or levels 205, such as, for example, normal operation, moderate shed, and high shed, that represents an overall level that a facility 104 should respond to. Typically, the levels may include a level to which a facility should try to reduce its consumption in very simple qualitative terms, even though the level is not necessarily a requirement. As long as the levels are a reasonable and manageable finite collection and have a well understood meaning, then virtually any set of levels may serve a desired purpose. A finite collection or number may mean a reasonably manageable amount or number. Examples may be 2, 3, 10, and so on. Finite does not necessarily mean just short of infinite which could indicate an unreasonable or unmanageable amount or number.

The next step or stage of the translation process may be depicted by item 207 and take the finite set or number of one or more demand-response levels 205 and translate one or more of them into a device specific state 203 or states 203. This translation step or stage may utilize the facility device data 110 and a user defined device configuration 204 from a device configurations database 113. The device state 203 may represent the state that device 106 should be in.

A final translation step or stage may be depicted by a device state to device command translation 201 and may take a desired device state 203 and create a set of one or more device specific commands 107 by utilizing the type specific device configuration 202 from device configurations 113. An output of this step or stage may be the set of device specific commands 107 that can be communicated to device 106 within facility 104.

Level 205 may set a value which is carried consistently as a state 203 and command 107 through the remainder of the demand response provider 102 (FIG. 1) to devices 106 of facility 104. Provider 102 may include steps or stages 206, 207 and 201 of the translation process (e.g., translators 206, 207 and 201) that adapt level 205, in accordance with facility device data 110, user defined device configuration 204, type specific device configuration 202, and other items as needed, for providing appropriate device commands 107 to devices 106.

Steps or stages 206, 207 and 201 of the translation process may be based on rules. The rules may be designed for one or more scenarios for usage of he one or more resources.

Once the translation of logic 109 is completed, the device commands 107 may be transmitted to device 106 using the message delivery infrastructure 208. The message delivery infrastructure 208 or communications module 208 may incorporate portions of communications management 108, device communication configurations 111, network communications infrastructure 105 and local communications network 115 as shown in FIG. 1.

Figure 3:
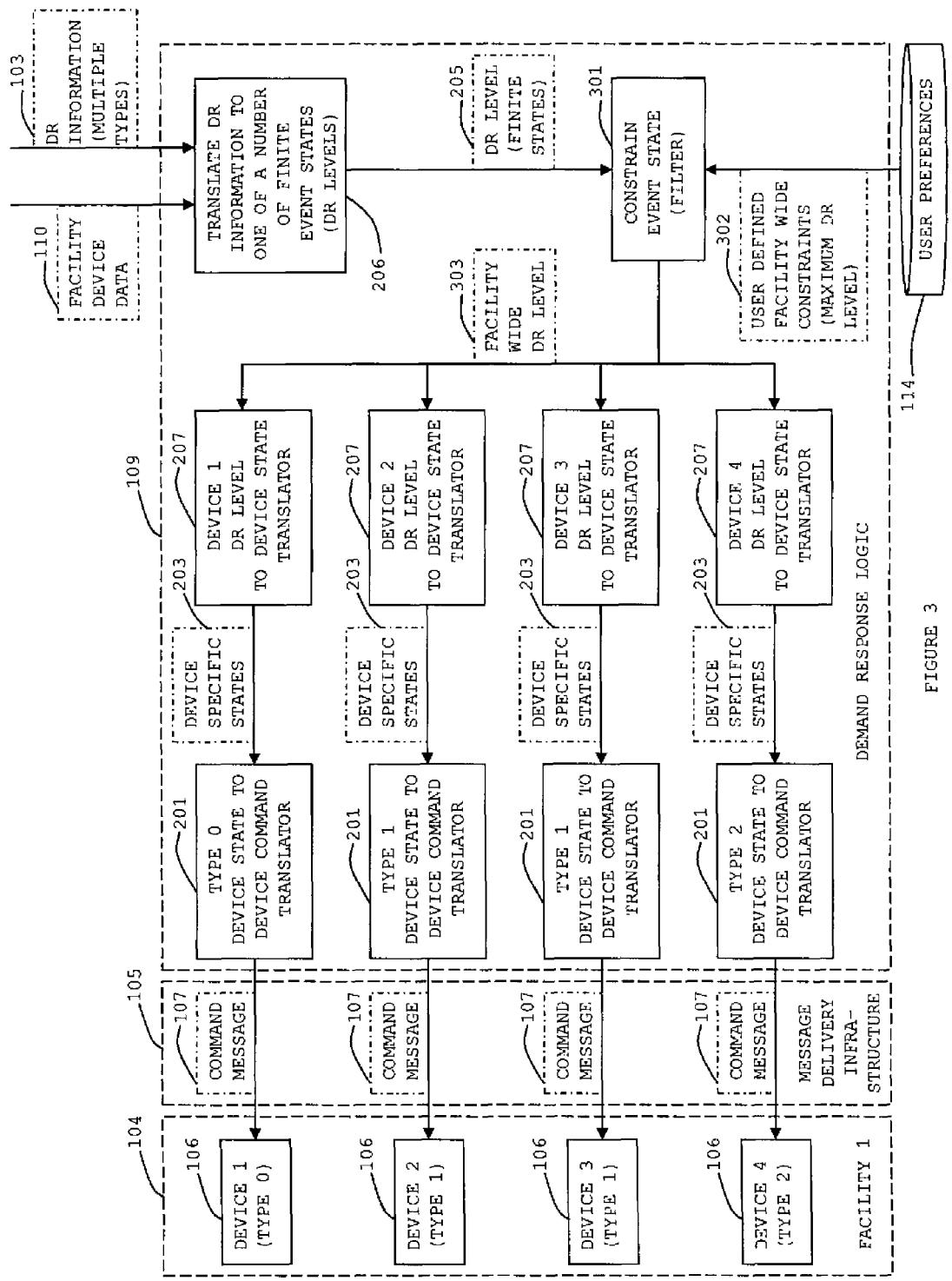
FIG. 3 is a diagram of an incorporation of facility wide requirements into a translation process.

FIG. 3 is a diagram of demand response logic 109 for providing command messages 107 to a multitude of devices 106 via the message delivery infrastructure 105. Incorporating facility wide requirements may be noted. Whereas FIG. 2 shows the translation process as it may be applied to a specific device 106; FIG. 3 depicts the translation process as it might be applied to virtually all of the devices 106 within a facility 104. The process may also be applied to a multitude of facilities 104. A difference in this process appears to be an addition of user defined facility wide constraints 302 (e.g., maximum demand-response level) that are used by a constraint filter 301, which may constrain an event state or demand-response level 205 from the translate demand-response information to one of a number of finite event states (demand response levels) 206 which receives demand-response information 103 and facility device data 110, to produce demand-response levels 303 that take into account a facility 104 as a whole. For example, a facility owner may decide that, regardless of the demand-response level which is indicated by the translation step or stage 206 of demand response logic 109, the facility will not necessarily respond above a certain level, including not at all. In addition, each of the specific devices 106 may now be differentiated and receive its own version of the demand-response level. The facility wide demand response signals 303 may progress through the respective device demand-response level to device state translator 207 which outputs device specific states 203. The states 203 may go to a type device state to device command translator 201 which outputs command messages 107 to the respective device 106 of a facility 104.

Figure 4:
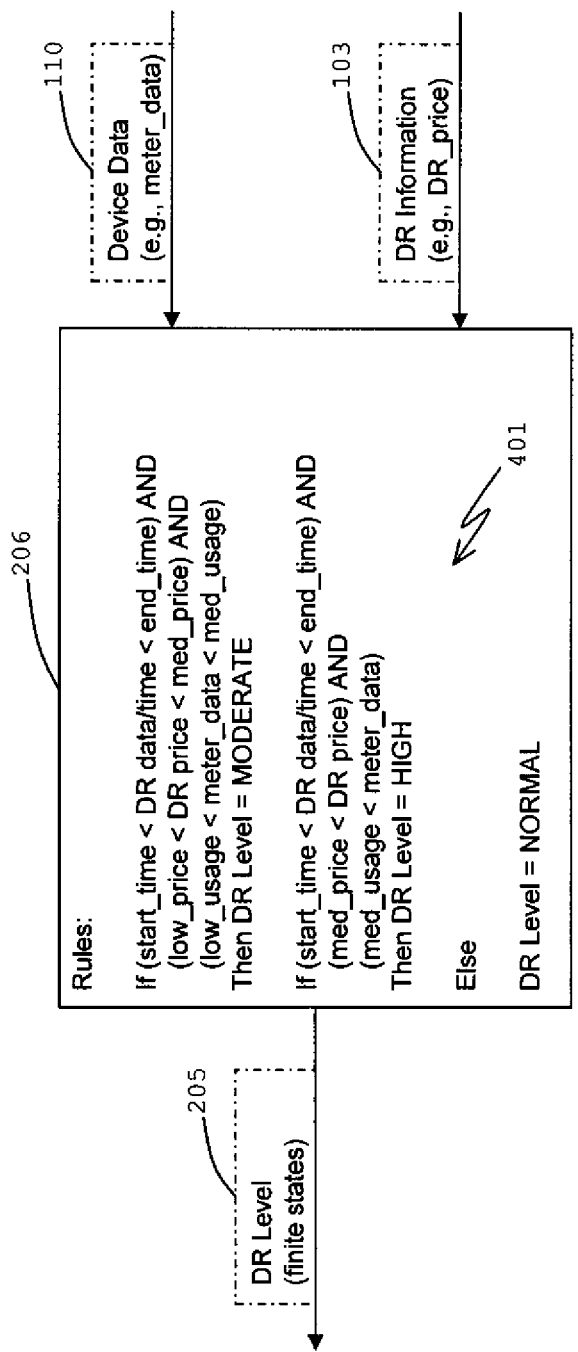
FIG. 4 is a diagram illustrating demand-response level translation rules.

FIG. 4 illustrates an approach 206 for translating demand-response information 103 and facility device data 110 to one or more demand-response levels 205. Because the demand-response levels 205 may represent a finite set of simple qualitative states, the task of converting the demand-response information 103 may be simplified. Each possible state of a demand-response level 205 may be associated with an elegant set of logical rules in translator 401 that takes into account the various sources, utility/ISO 101 and facility device data logs 112, of information, which may include prices in the demand-response information 103, the date and time, facility device data 110, such as meter information, and additional user defined parameters, including possibly whether to opt out of responding to demand-response actions.

Sources 101 and 112 of information 103 and 110, in combination with an aggregation of logical operations, may allow a specification of a rich set of rules that are easy to specify and construct user interfaces to aid in the specification process. The translation approach 206, with example rules, is shown in a diagram of FIG. 4. These rules may be specified either by a facility owner or by the demand-response services provider on behalf of the facility owner. These rules may be easily drafted, changed or redone by nearly anyone to suit a need or intent of the recipient and/or provider of the demand-response services. The rules may be a basis for indicating the demand-response levels as being pre-defined or pre-determined.

Figures 5A, 5B:
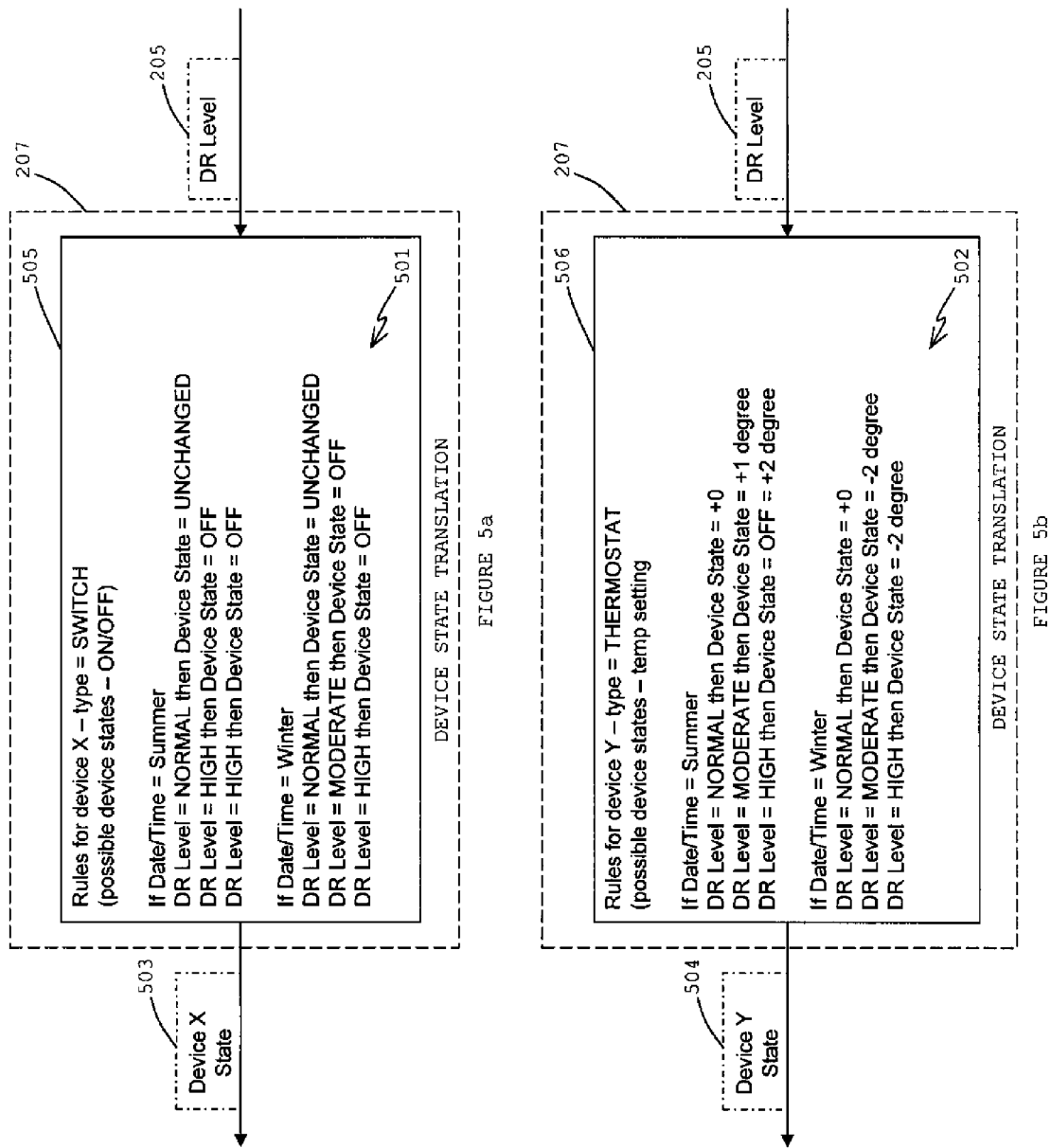
FIGS. 5a and 5b are diagrams depicting demand-response level-to-device state translation rules.

The rules cited as an instance in FIG. 4 may state the following.
Rules:
If (start_time<DR data/time<end_time) AND (low_price<DR price<med_price) AND (low_usage<meter_data<med_usage)
Then DR Level=MODERATE
If (start_time<DR data/time<end_time) AND (med_price<DR price) AND (med_usage<meter_data)
Then DR Level=HIGH
Else
DR Level=NORMAL The diagrams of FIGS. 5a and 5b illustrate details of the process of translating demand response levels 205 to device states 503, 504 for two example devices X and Y, respectively. A basis of translator 207 may be a set of rules. These rules may be easily drafted, changed or redone by nearly anyone to suit a need or intent of the recipient and/or provider of the demand-response services.

With constrain filter 301 incorporated, facility wide demand-response levels 303 may be input in lieu of demand-response levels 205 to translators 207 (FIG. 3). Each device 106 may be a specific type and the type of the device will dictate the set of device states that the device may be in. FIG. 5a shows one set of rules 505 of the device demand-response level to device state translator 207, for a device such as a switch with a simple ON or OFF state. The rules shown in translator 501 depict example rules when to turn on or off the switch represented by device X. The rules cited as an instance in FIG. 5a may state the following.
Rules for device X–type=SWITCH
(possible device states—ON/OFF)
If Date/Time=Summer
DR Level=NORMAL then Device State=UNCHANGED
DR Level=HIGH then Device State=OFF
DR Level=HIGH then Device State=OFF
If Date/Time=Winter
DR Level=NORMAL then Device State=UNCHANGED
DR Level=MODERATE then Device State=OFF
DR Level=HIGH then Device State=OFF FIG. 5b shows another set of rules 506 indicating how a different device type could have a different set of possible device states. In the case of rules 506, the rules of another device demand-response level to device state translator 207, may be for a thermostat that may have temperature set points as its state. The rules shown in translator 502 depict example rules that dictate how much to turn up or down the thermostat represented by device Y.

Because the demand-response levels 205 may be a relatively small finite set, the process of translating those into specific device states 503, 504, respectively, may also be relatively simple and include things such as date and time. The rules may consist of a set of easy to specify logical operations. The levels may also simplify a task of constructing user interfaces to aid in the rule specification process. The rules may be specified either by the facility owner or by the demand-response services provider on behalf of the facility owner. The rules cited as an instance in FIG. 5b may state the following.
Rules for device Y–type=THERMOSTAT
(possible device states—temp setting
If Date/Time=Summer
DR Level=NORMAL then Device State=+0
DR Level=MODERATE then Device State=30 1 degree DR Level=HIGH then Device State=OFF=+2 degree
If Date/Time=Winter
DR Level=NORMAL then Device State=+0
DR Level=MODERATE then Device State=−2 degree
DR Level=HIGH then Device State=−2 degree Translating device states to device commands may be noted. A basis of translator 201 may be a set of rules. These rules may be easily drafted, changed or redone by nearly anyone to suit a need or intent of the recipient and/or provider of the demand-response services. As depicted in FIGS. 6a and 6b, a final step in the translation process at items 201 may be to convert the device states 503, 504 into device specific commands 605, 606 to example devices X and Y, respectively, with rules 603, 604, translators 601 and 602. This step does not necessarily require that the user pre-specify any rules, since the step may be virtually completely dependent upon the device type. Presumably each type of device 106 may have a type specific device configuration (202 in FIG. 2) that specifies a set of possible device states and fixed rules for converting or translating device states to device commands.

It may be noted that it is possible to define a set of generic service types such as "switch" or "thermostat" that may be translated into specific device commands, depending upon how a specific device in the facility is implemented. For example, switch A may support a different command for turning it ON or OFF than that supported by switch B, but both switches may support device states ON and OFF. Thus, the translation process in this step at item 201 may be dependent upon the specific device that exists within the facility.

An example of contents for translator 601 may state the following.
Translation for device X–type=SWITCH
(possible device states—ON/OFF)
If device state=OFF then Device Command=TURN_OFF
If Device State=ON then Device Command=TURN_ON An example of contents for translator 602 may state the following.
Translation for Device Y–type=THERMOSTAT
CHANGE_SETTING number of degrees In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A demand-response control system, having hardware and software, comprising:
a logic module for converting resource demand-response information into device commands for devices to control usage of a resource at a facility; and
a communications module for conveying the device commands from the logic module to the devices;
wherein:
the logic module comprises:
 a demand-response information to demand-response level translator, which converts demand response information to a demand response level;
 a demand-response level to device state translator connected to the demand-response level translator, which converts the demand-response level to a device state; and
 a device state to device command translator connected to the demand-response level to device state translator, which converts the device state to a device command; and
the demand-response level dictates an amount of usage of the resource at the facility;
the demand-response level is selected from a pre-defined finite set of demand-response levels;
for at least one translator of the demand-response information to demand-response level translator, the demand-response level to device state translator, and the device state to device command translator, an output of the at least one translator incorporates less information than is input into the at least one translator; and
one or more of the modules are composed of hardware and software.

2. The system of claim 1, wherein modifiable rules are a basis of the demand response information to demand-response level translator, the demand-response level to device state translator, and/or the device state to device command translator.

3. The system of claim 1, wherein data of one or more devices of the facility are provided to the demand-response information to demand-response level translator and/or to the demand-response level to device state translator.

4. The system of claim 1, wherein:
a user defined configuration is provided to the demand-response level to device state translator; and
a type specific device configuration is provided to the device state to device command translator.

5. The system of claim 1, wherein:
the communications module comprises a communications management sub-module and/or a network communications infrastructure; and
one or more device communication configurations are provided to the communications management sub-module.

6. A method for demand-response services comprising:
providing input demand-response information from a resource provider and/or facility device information to a demand-response logic module;
translating the input demand-response information and/or facility device information into at least one of a pre-defined finite number of demand-response levels;
translating the demand-response levels to device states; and
translating the device states to device commands for activating one or more devices of a facility;
wherein:
the at least one of the predefined finite number demand-response levels comprises a basis for dictating an amount of usage of one or more resources;
the one or more devices control usage of the one or more resources at the facility according to the device commands;
the demand-response logic module is configured to translate input demand-response information into one of the pre-defined finite number of demand-response levels, the one of the pre-defined finite number of demand-response levels encoding less information than the input demand-response information; and
one or more of the modules are composed of hardware and software.

7. The method of claim 6, wherein the predefined number of demand-response levels comprises at least one of a normal level, a moderate level and a high level.

8. The method of claim 6, wherein the demand-response levels are determined by a set of rules applied to the demandresponse information and/or facility device information at the demand-response logic module.

9. The method of claim 8, wherein:
the demand-response levels are translated to the device states according to a set of rules; and
the device states are translated to the device commands according to a set of rules; and
the sets of rules are designed for one or more scenarios for usage of the one or more resources.

10. The method of claim 6, further comprising filtering the finite number of demand-response levels with a constraint demand-response level filter.

11. A system for providing demand response services, having hardware and software, comprising:
a demand-response logic module;
wherein:
the demand-response logic module has an input for receiving demand-response information relative to a resource from a provider;
the demand-response logic module has an output for providing command signals to direct usage of the resource by a recipient; and
wherein:
the command signals are communicated to one or more devices of the recipient; and
the one or more devices control usage of the resource according to the command signals;
a basis of the command signals is a pre-defined finite number of demand-response levels;
the demand-response logic module is configured to translate input demand-response information into one of the pre-defined finite number of demand-response levels, wherein the command signals are communicated to one or more devices of the recipient; the one or more devices control usage of the resource according to the command signals; and the one of the pre-defined finite number of demand-response levels encoding less information than the input demand-response information;
the one of the predefined number of demand-response levels indicates a specific amount of usage of a resource; and
one or more of the modules are composed of hardware and software.

12. The system of claim 11, wherein the resource is electricity.

13. The system of claim 11, wherein:
a demand-response level of the pre-defined finite number of demand-response levels is determined by a first set of rules applied to demand-response information and data about the devices;
the demand-response level is translated into a device state according to a second set of rules;
the device state is translated into one or more device commands according to a third set of rules; and
the rules are modifiable.

14. The system of claim 11, further comprising:
a user preferences module connected to the demand-response logic module; and
a device configurations module connected to the demand-response logic module.

15. The system of claim 11, further comprising a communications management module connected to the output of the demand-response logic module.

16. The system of claim 15, further comprising a recipient device data log module connected to the demand-response logic module and the communications management module.

17. The system of claim 15, further comprising a device communication configurations module connected to the communications management module.

* * * * *